(12) United States Patent
Zeng et al.

(10) Patent No.: US 9,661,319 B2
(45) Date of Patent: May 23, 2017

(54) METHOD AND APPARATUS FOR AUTOMATIC CALIBRATION IN SURROUNDING VIEW SYSTEMS

(71) Applicant: GM GLOBAL TECHNOLOGY OPERATIONS LLC, Detroit, MI (US)

(72) Inventors: Shuqing Zeng, Sterling Heights, MI (US); Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 14/283,508

(22) Filed: May 21, 2014

(65) Prior Publication Data

US 2015/0341628 A1 Nov. 26, 2015

(51) Int. Cl.
*H04N 9/47* (2006.01)
*H04N 7/18* (2006.01)
(Continued)

(52) U.S. Cl.
CPC ............. *H04N 17/002* (2013.01); *B60R 1/00* (2013.01); *G06K 9/00791* (2013.01); *G06K 9/4604* (2013.01); *G06T 7/0018* (2013.01); *G06T 7/0028* (2013.01); *H04N 5/265* (2013.01); *H04N 5/2628* (2013.01); *B60R 2300/402* (2013.01); *G06T 2207/10016* (2013.01);
(Continued)

(58) Field of Classification Search
CPC .... H04N 17/002; H04N 5/2628; H04N 5/265; G06K 9/4604; G06K 9/00791

USPC ......................................................... 348/148
See application file for complete search history.

(56) References Cited

U.S. PATENT DOCUMENTS 8,917,317 B1 * 12/2014 Beeler ............................ 348/47
2009/0058987 A1 * 3/2009 Thielman ............. H04N 17/002
348/14.08

(Continued)

OTHER PUBLICATIONS

Davide Scaramuzza, et al., A toolbox for Easily Calibrating Omnidirectional Cameras, Proceedings of the 2006 IEEE/RSJ, International Conference on Intelligent Robots and Systems, Oct. 9-15, 2006, Beijing China, pp. 5695-5701.

(Continued)

*Primary Examiner* — Mehrdad Dastouri
*Assistant Examiner* — Jared Walker
(74) *Attorney, Agent, or Firm* — Quinn IP Law

(57) ABSTRACT

An embodiment contemplates a method of calibrating multiple image capture devices of a vehicle. A plurality of image capture devices having different poses are provided. At least one of the plurality of image capture devices is identified as a reference device. An image of a patterned display exterior of the vehicle is captured by the plurality of image capture devices. The vehicle traverses across the patterned display to capture images at various instances of time. A processor identifies common landmarks of the patterned display between each of the images captured by the plurality of image capture devices and the reference device. Images of the patterned display captured by each of the plurality of image devices are stitched using the identified common landmarks. Extrinsic parameters of each image capture device are adjusted relative to the reference device based on the stitched images for calibrating the plurality of image capture devices.

14 Claims, 4 Drawing Sheets

(51) Int. Cl.
*H04N 17/00* (2006.01)
*G06K 9/00* (2006.01)
*G06K 9/46* (2006.01)
*H04N 5/262* (2006.01)
*H04N 5/265* (2006.01)
*B60R 1/00* (2006.01)
*G06T 7/00* (2017.01)

(52) U.S. Cl.
CPC ............ *G06T 2207/30244* (2013.01); *G06T 2207/30252* (2013.01)

(56) References Cited

U.S. PATENT DOCUMENTS

| | | | | |
|---|---|---|---|---|
| 2010/0315424 A1* | 12/2010 | Cai | ........................ | G06T 7/0065 345/427 |
| 2012/0154586 A1* | 6/2012 | Chung | ................. | H04N 17/002 348/148 |
| 2012/0214590 A1* | 8/2012 | Newhouse | .............. | G06F 3/011 463/31 |
| 2012/0287232 A1* | 11/2012 | Natroshvili | ........... | G06T 7/0028 348/36 |

OTHER PUBLICATIONS

Juho Kannala, et al., A generic Model and Calibration Method of Conventional, Wide-Angle, and Fish Eye Lenses, http://www.ee.oulu.fi/~jkannala/publications/tpami2006.pdf.

* cited by examiner

METHOD AND APPARATUS FOR AUTOMATIC CALIBRATION IN SURROUNDING VIEW SYSTEMS

BACKGROUND OF INVENTION

An embodiment relates to vehicle imaging systems.

Vision based imaging system utilized image capture devices to detect objects exterior for various vehicle applications including collision avoidance systems, automated cruise control, and parking assistance. If more than one camera is being used, then the camera calibration must be applied between each of the image capture devices. Not only must the imaging device be calibrated between one another, the camera must be calibrated with respect to the vehicle profile or pose. As a result, misalignment in overlapping zones between image capture devices, image stitching, as well as distance estimation functions must be compensated.

SUMMARY OF INVENTION

An advantage of an embodiment is a calibration of multiple cameras of a surround view system that can be utilized at a service station garage or on an assembly line. The technique described herein provides a low-cost approach for autonomously updating and correcting camera calibration parameters by capturing images of a patterned display, identifying common landmarks, and correlating the common landmarks to a reference image captured by the reference camera. The technique described herein reduces the complication in having to make or purchase specialized or complicated tooling required to calibrate each of the cameras.

An embodiment contemplates a method of calibrating multiple image capture devices of a vehicle. A plurality of image capture devices having different poses are provided. At least one of the plurality of image capture devices is identified as a reference device. An image of a patterned display exterior of the vehicle is captured by the plurality of image capture devices. The patterned display includes multiple landmarks of known positions. Each image capture device captures at least a portion of the patterned display. The vehicle traverses across the patterned display to capture images at various instances of time by the plurality of image capture devices. A processor identifies common landmarks of the patterned display between each of the images captured by the plurality of image capture devices and the reference device. Images of the patterned display captured by each of the plurality of image devices are stitched using the identified common landmarks. Extrinsic parameters of each image capture device are adjusted relative to the reference device based on the stitched images for calibrating the plurality of image capture devices.

DETAILED DESCRIPTION

Figure 1:
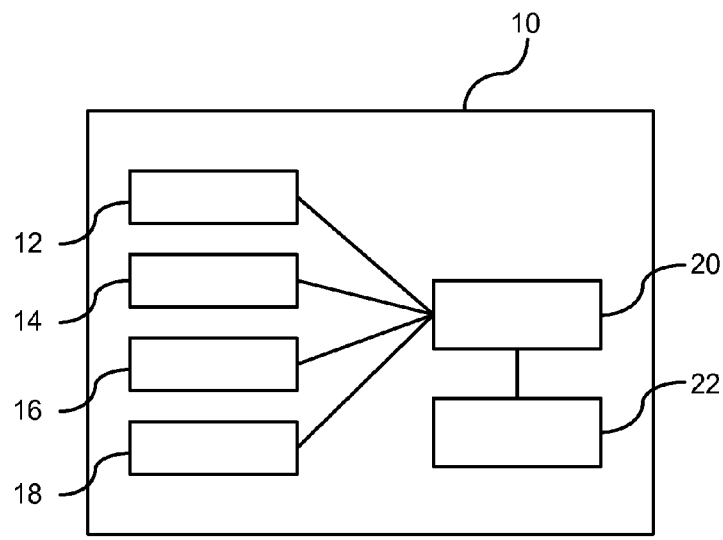
FIG. 1 illustrates a block diagram of an object detection system that is used for collision avoidance or object detection systems.

FIG. 1 illustrates a block diagram of an object detection system that is used for collision avoidance or object detection systems. The vehicle 10 includes a front-facing image capture device 12, a left-facing image capture device 14, a right-facing image capture device 16, and a rear-facing image capture device 18. Each of the image capture devices hereinafter will be referred to as cameras, however, it should be understood that the image capture device is not limited to a camera. Each of the cameras capture a region exterior of the vehicle which is provided to a vehicle processor 20. The processor 20 utilizes the capture images for detecting objects exterior of the vehicle for determining their proximity to the vehicle 10. The detection of objects can be used by various vehicle applications including, but not limited to, collision alert, automated cruise control, and driver vision enhancement. A memory 22 may be used to store data that is used to analyze the images.

Vehicles that are equipped with more than one camera must have alignment correspondence between one another so that the data can be cooperatively used when processed. If the cameras are not aligned to one another, the data will be skewed when the data is analyzed, and accuracy as to the location of the detected objects will be inaccurate resulting in inaccurate outputs of the vehicle applications utilizing the input data. The procedure described herein provides a less complex approach for camera alignment and synchronization.

Figure 2:
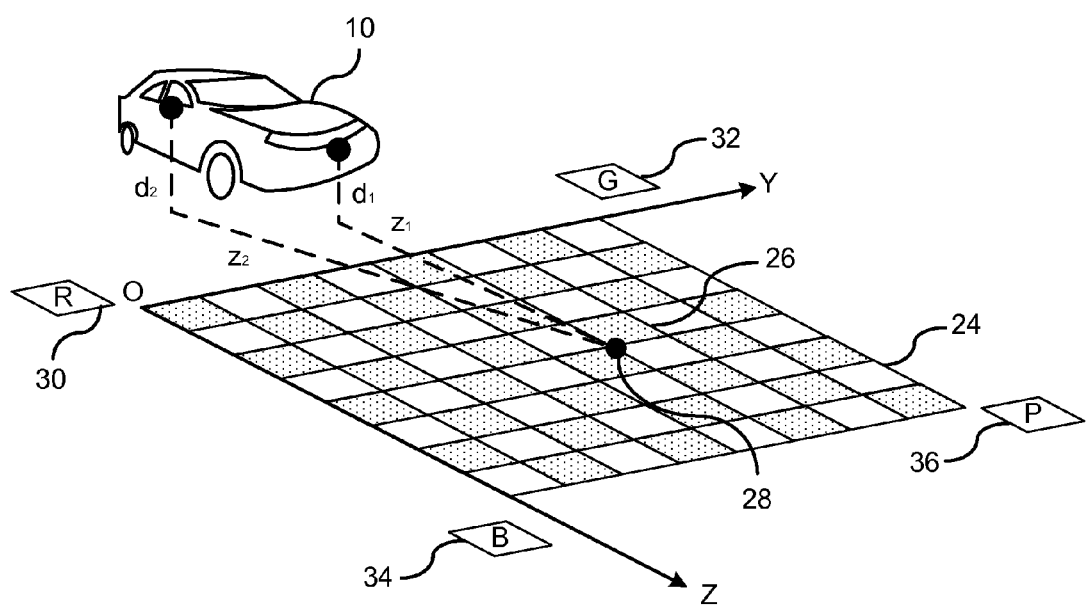
FIG. 2 is an exemplary representation of a vehicle traversing across a patterned display.
Figure 3A:
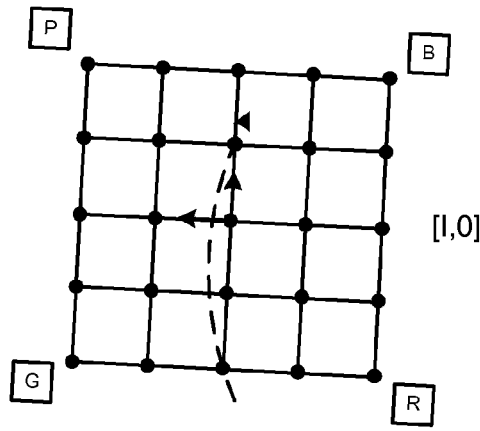
FIGS. 3a-d represents respective images of patterned displays captured by image capture devices.
Figure 3C:
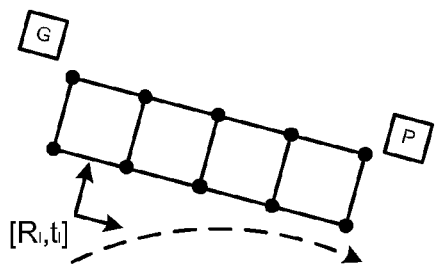
Figure 3D:
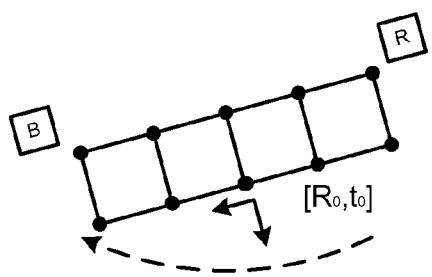
Figure 3B:
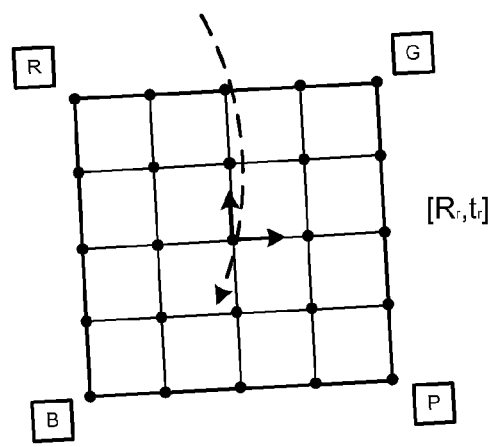

FIG. 2 illustrates the vehicle 10 traversing across a patterned display 24 on the ground floor. Preferably the patterned display is a pattern having identifiable edges 26 that distinguish the respective patterns distinctly, such as a checkered floorboard pattern. The pattern represents a grid system wherein the where edges 26 distinguish the alternating patterns from one another and the intersecting lines of the edges designate identifiable location points 28 in the grid.

Common landmarks including, but not limited to landmarks 30, 32, 34, and 36 of the patterned display 24 are identified. Common landmarks 30, 32, 34, 36 identify corners of the patterned display which enable the orientation of the patterned display to be easily identifiable in a captured image. The common landmarks are used for identifying commonalities when the images captured by the plurality of image capture devices are compared. As the vehicle traverses across the patterned display 24, the each of the cameras will capture at least a portion of the patterned display. For example, prior to the vehicle reaching the patterned display 24, the forward facing camera captures the entire patterned display 24. As the vehicle moves onto and over the patterned display, the right facing camera and the left facing camera will only capture a portion of the patterned display 24. As the vehicle moves off of the patterned display 24, the rear-facing camera 26 captures the entire patterned display 24. The image from the forward-facing image is identified as the reference image.

For each image captured by each camera, the orientation of each captured image will be different relative to the reference image. FIGS. 3a-d illustrates each of the patterned displays captured by each of the image capture devices. For each of FIGS. 3a-d, the respective common landmarks (e.g., corners) are identified. Utilizing the common landmarks between images as well as the edges (i.e., principle lines) and intersection points (i.e., feature points) within the patterned display, the various images may be oriented and aligned by identifying correspondence between the landmarks and feature points of the reference image and the other images. The identified common landmarks allow each of the images to be aligned with respect to a reference image. Once the each of the grid maps are aligned, each of the camera trajectories are solved for.

After solving each of the camera's trajectories, each camera's pose may be solved for relative to the forward facing camera utilizing a rotational matrix and a translation matrix. Rotational matrix involves rotational motion of the camera and is based on a fixed camera centering point in a 3-dimensional coordinate system. The camera would be rotated in free space while maintaining its camera centering point.

Figure 4:
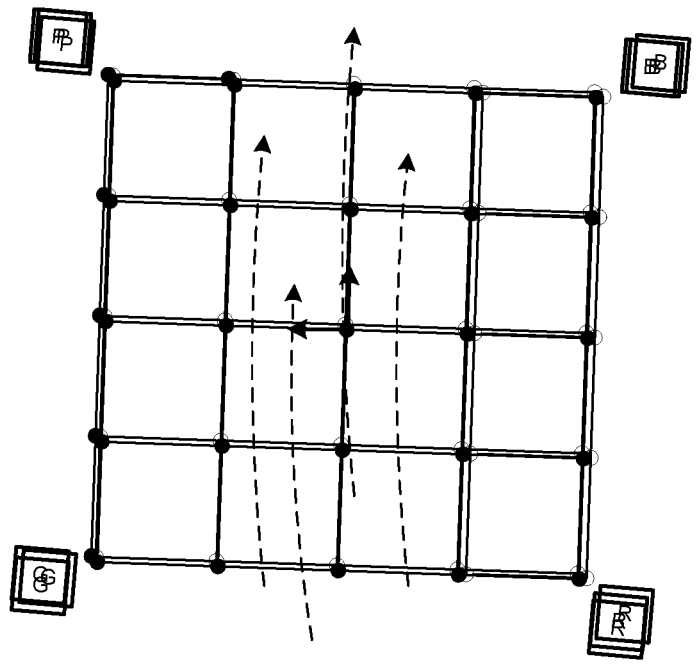
FIG. 4 is an alignment if images captured by the respective image capture devices.

The translation matrix involves translation motion that changes the position of the object as opposed to rotation. A rotational matrix and a translational matrix of a respective camera are determined for aligning the image grids with the front-facing image grid. The front-facing camera will be the respective pose [l, 0]; the left-facing camera will have a respective pose $[R_l, t_l]$; the right-facing camera will have a respective pose $[R_g, t_g]$; and the rear-facing camera will have a respective pose $[R_r, t_r]$. The relative extrinsic parameters of the non-forward facing cameras are estimated relative to the front facing camera. The camera extrinsic parameters are modified for aligning the non-forward facing cameras with respect to the forward facing cameras as shown in FIG. 4.

Figure 5:
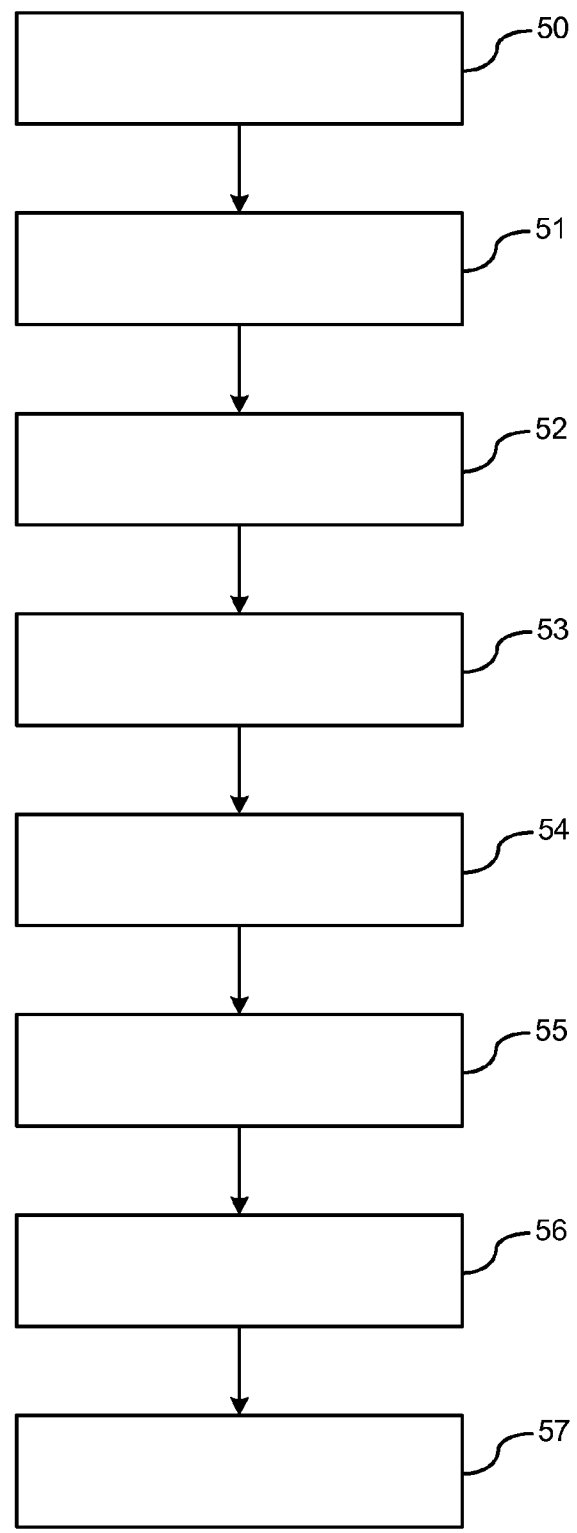
FIG. 5 is a flowchart of a method illustrating temporal integration of each camera pose over time.

FIG. 5 is a flowchart of a method illustrating temporal integration of each camera pose over time. In block 50, a patterned display such as a checkered board pattern on a ground floor is provided. The checkerboard has multiple landmarks with known positions that include, but are not limited to, corner boundaries and colored squares.

In block 51, a vehicle is traversed across the patterned display with each respective camera capturing images of the patterned display at different time instances. Fisheye cameras are preferably used. Moreover, the vehicle may be driven across the patterned display or a vehicle may be on an apparatus that traverses the vehicle across the pattern display.

In block 52, multiple frames as captured by a respective camera of the patterned display are stitched together. This is performed for each respective camera. To estimate an initial pose for each respective camera, the following sub-routine is utilized. At time t=0, M represents the observed grid by the respective camera. At time t=1, S represents the observed grid by the same respective camera. The objective is to find the pose of the respective camera at t=0 and then to stitch grids S and M together to generate an enhanced grid M'.

At t=0, the camera pose $(R_0, t_0)$ is determined given M utilizing the technique described in the following publications "Flexible Camera Calibration by Viewing a Plane from Unknown Orientations" by Zhengyou Zhang, ICCV, Sep. 20-27, Kerkyra, Greece, 1999; and A Four-step Camera Calibration Procedure with Implicit Image Correction, Janne Heikkila and Olli Silven, CVPR97, Jun. 17-19, 1997, San Juan, Puerto Rico, 1997.

A delta pose $(\Delta R_1, \Delta t_1)$ is determined by using the readings from vehicle speed $v_H$ and yaw rate $\omega_H$ if they are available from vehicle sensors as represented by the following matrix:

$$\Delta R_1 = \begin{pmatrix} \cos(\omega_H \Delta_t) & -\sin(\omega_H \Delta_t) & 0 \\ \sin(\omega_H \Delta_t) & \cos(\omega_H \Delta_t) & 0 \\ 0 & 0 & 1 \end{pmatrix}, \Delta t_1 = R_0 \begin{pmatrix} v_H \Delta_t \\ 0 \\ 0 \end{pmatrix}$$

This is regarded as a motion model.

Between the current pose at t=0 and the pose at t=1 given the match between S and M, the camera pose $(R_1, t_1)$ is estimated for observed grid S at time t=1. This is regarded as the measurement model.

An extended Kalman filter is used to refine the camera pose $(R'_1, t'_1)$ at time t=1.

Figure 6:
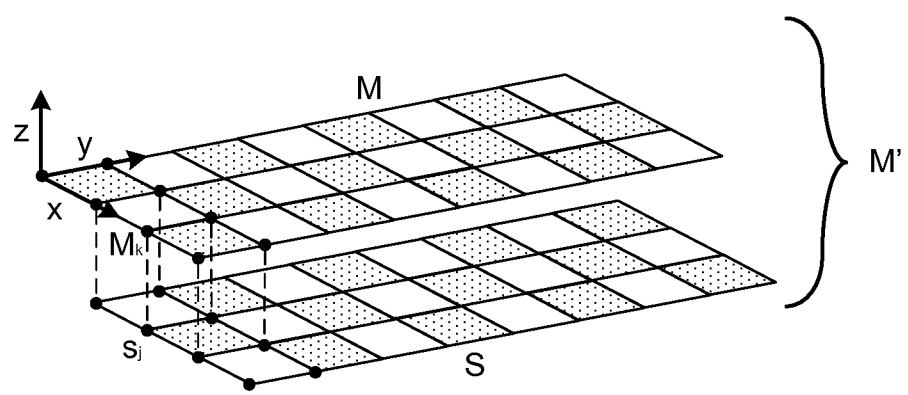
FIG. 6 is a stitched grid map of two images captured by a respective time at different instances of time.

Grid S is stitched back to grid M resulting in the enhanced grid M' when both poses become known. The enhanced grid M' is updated in reference to a ground coordinate frame O-XYZ. This provides an initial camera post for this respective camera. As a result, a stitched grid map is determined for the respective camera and the camera trajectory with respect to the grid map as shown in FIG. 6.

Similar procedure is executed for t=2, . . . , T as in t=1.

As alternative approach, if vehicle speed $v_H$ and yaw rate $\omega_H$ are not available, the camera pose $(R_t, t_t)$ for t=1, . . . , T is determined by matching the given M and the observed current grid $S_t$.

The observed grid $S_t$ for t=1, . . . , T is projected back and stitched to M for an enhanced M'.

In block 53, the relative extrinsic properties of each respective camera relative to the reference camera (e.g., front facing camera) are estimated.

In block 54, using landmarks such as principle lines (e.g., distinguishing identifiable edges) and color squares, correspondence is found between features points of each of the cameras respectively. That is, corresponding corners between respective images from different cameras are identified, in addition to shaded squares, principle lines, and feature points (e.g., intersecting lines).

In block 55, given the correspondence of the corners, edges, squares and feature points, the grid maps of the images captured by the respective cameras are aligned. Each camera trajectory is determined.

In block 56, based on the alignment, each camera pose with respect to the reference camera (e.g., front facing camera) is determined. The camera pose is defined by its rotation and translation matrix.

For time t=1, . . . , T, let $\{(R_t^F, t_t^F)\}$ be the front camera trajectory, $\{(R_t^L, t_t^L)\}$ be the left camera trajectory, $\{(R_t^G, t_t^G)\}$ be the right camera trajectory, and $\{(R_t^R, t_t^R)\}$ be the rear camera trajectory. The estimated pose with respect to front-facing camera will be computed as: The left-facing camera relative pose $[R_l, t_l]$:

$$\bar{R}_l = \frac{1}{T}\sum_{t=0}^{T} R_t^L (R_t^F)^T, \; t_l = \frac{1}{T}\sum_{t=0}^{T}(R_t^F)^T(t_t^L - t_t^F)$$

The right-facing camera relative pose $[R_g, t_g]$:

$$\bar{R}_g = \frac{1}{T}\sum_{t=0}^{T} R_t^G (R_t^F)^T, \; t_l = \frac{1}{T}\sum_{t=0}^{T}(R_t^F)^T(t_t^G - t_t^F)$$

The rear-facing camera relative pose $[R_r, t_r]$:

$$\bar{R}_r = \frac{1}{T}\sum_{t=0}^{T} R_t^R (R_t^F)^T, \; t_r = \frac{1}{T}\sum_{t=0}^{T}(R_t^F)^T(t_t^R - t_t^F)$$

The derived $\bar{R}_l$, $\bar{R}_g$, and $\bar{R}_r$ are not rotation matrices. The following normalization process is needed to find the nearest rotation matrix. Given a non-rotation matrix $\bar{R}$, it is desirable to find the a rotation matrix R, such that the Frobenius matrix norm is minimized:

$$\min_{R} \|\bar{R} - R\|_F.$$

The solution of the above optimization is $R=UV^T$, where U and V are left and right singular vectors of $\overline{R}$, i.e., $\overline{R}=U\Sigma V^T$ and $\Sigma$ is diagonal matrix of singular values.

In block 57, in response to a determining the pose of each cameras are calibrated so that correspondence is applied in reference to the front camera.

While certain embodiments of the present invention have been described in detail, those familiar with the art to which this invention relates will recognize various alternative designs and embodiments for practicing the invention as defined by the following claims.

What is claimed is:

1. A method of calibrating multiple image capture devices of a vehicle, the method comprising:
    providing a plurality of image capture devices having different poses, at least one of the plurality of image capture devices being identified as a reference device;
    capturing an image of a patterned display exterior of the vehicle by the plurality of image capture devices, the patterned display including multiple landmarks of known positions, each image capture device capturing at least a portion of the patterned display;
    traversing the vehicle across the patterned display to capture images at various instances of time by the plurality of image capture devices;
    identifying, by a processor, common landmarks of the patterned display between each of the images captured by the plurality of image capture devices and the reference device;
    stitching images of the patterned display captured by each of the plurality of image capture devices using the common landmarks; and
    adjusting extrinsic parameters of each image capture device relative to the reference device based on the stitched images for calibrating the plurality of image capture devices,
    wherein identifying common landmarks of the patterned display includes identifying correspondence within the patterned display between the images captured by the plurality of image capture devices and the reference device, and
    wherein identifying correspondence within the patterned display includes at least one of:
        identifying corners of an outer boundary of the patterned display,
        identifying common edges that distinguish patterns within the patterned display among each of the captured images, or
        identifying common points generated by common intersecting edges within the patterned display.

2. The method of claim 1 wherein adjusting the extrinsic parameters include adjusting a rotation of the image capture device.

3. The method of claim 1 wherein traversing the vehicle across the patterned display includes traversing the vehicle across a checkered floorboard pattern, the checkered floorboard pattern representing a grid.

4. A method of calibrating multiple image capture devices of a vehicle, the method comprising:
    providing a plurality of image capture devices having different poses, at least one of the plurality of image capture devices being identified as a reference device;
    capturing an image of a patterned display exterior of the vehicle by the plurality of image capture devices, the patterned display including multiple landmarks of known positions, each image capture device capturing at least a portion of the patterned display;
    traversing the vehicle across the patterned display to capture images at various instances of time by the plurality of image capture devices;
    identifying, by a processor, common landmarks of the patterned display between each of the images captured by the plurality of image capture devices and the reference device;
    stitching images of the patterned display captured by each of the plurality of image capture devices using the common landmarks; and
    adjusting extrinsic parameters of each image capture device relative to the reference device based on the stitched images for calibrating the plurality of image capture devices,
    wherein the patterned display includes a grid, wherein stitching images of the patterned display include aligning corresponding common landmarks of the grid between each of the images captured by the plurality of image capture devices and the reference device
    wherein each of the captured images from the plurality of image capture devices is re-oriented to align the corresponding common landmarks of the image captured by the reference device, and
    wherein trajectories for each image capture device are determined based on re-orientation of the images for aligning the corresponding common landmarks.

5. A method of calibrating multiple image capture devices of a vehicle, the method comprising:
    providing a plurality of image capture devices having different poses, at least one of the plurality of image capture devices being identified as a reference device;
    capturing an image of a patterned display exterior of the vehicle by the plurality of image capture devices, the patterned display including multiple landmarks of known positions, each image capture device capturing at least a portion of the patterned display;
    traversing the vehicle across the patterned display to capture images at various instances of time by the plurality of image capture devices;
    identifying, by a processor, common landmarks of the patterned display between each of the images captured by the plurality of image capture devices and the reference device;
    stitching images of the patterned display captured by each of the plurality of image capture devices using the common landmarks; and
    adjusting extrinsic parameters of each image capture device relative to the reference device based on the stitched images for calibrating the plurality of image capture devices,
    wherein adjusting the extrinsic parameters includes adjusting a rotation of the image capture device based on determined trajectories that align the image,
    wherein the each of the plurality of image capture devices is rotated from an initial pose to align each captured image, wherein the initial pose for each captured image device is determined from a stitched grid map based on images captured by a respective image capture device at least two instances of time.

6. The method of claim 5 wherein determining an initial pose for a respective image capture device comprises:
    capturing a grid at a first instance of time and a second instance of time;
    determining a first pose of the respective image capture device at a first instance of time based on an observance of a captured grid at the first instance of time, wherein the first pose of the respective image capture device is defined by a first rotation parameter and a first translation parameter at the first instance of time;

calculating a change in the first pose between the first instance of time and the second instance of time;

determining a second pose at the second instance of time based on the change in the first pose between the first instance of time and the second instance of time;

generating an enhanced grid by stitching the capture grid at the first instance of time with the captured grid at the second instance of time based on the determined first and second camera poses; and updating the enhanced grid in a ground coordinate frame.

7. The method of claim 6 wherein the determination of the initial pose is determined for each of the plurality of image capture devices.

8. The method of claim 7 wherein adjusting extrinsic parameters of each image capture device relative to the reference device is based on the stitching images as a function of the initial pose of each of the plurality of image capture device.

9. The method of claim 6 wherein the second pose determined at the second instance of time is refined utilizing a Kalman filter.

10. The method of claim 6 wherein calculating a difference in the first pose between the first instance of time and the second instance of time is based on a determination of difference between the first rotation parameter and a second rotational parameter at the second instance of time, and a difference between the first translation parameter and a second translation parameter at the second instance of time.

11. The method of claim 10 wherein each image capture device pose is represented by a rotation and translation matrix.

12. The method of claim 11 wherein a respective relative pose is used to determine the image capture device pose, wherein a respective relative pose is a non-rotational matrix, and wherein normalization process is used to find a nearest rotation matrix as a function of the respective relative pose.

13. The method of claim 12 wherein nearest rotation matrix is determined as a function of the non-rotation matrix by minimizing a Frobenius matrix norm as represented by the following formula:

$$\min_{R} \|\bar{R} - R\|_F$$

where $\bar{R}$ represents a non-rotation matrix and R represents a non-rotation matrix.

14. The method of claim 13 wherein the determination of the rotation matrix is optimized as function of the following equation:

$$R = UV^T$$

where U and V are right and left singular vectors of $\bar{R}$, T is a respective time value, and $\bar{R} = U\Sigma V^T$ where S is diagonal matrix of singular values.

* * * * *